US012107934B1

(12) United States Patent
Bailey et al.

(10) Patent No.: US 12,107,934 B1
(45) Date of Patent: Oct. 1, 2024

(54) DELIVERY GUARANTEE COMPLIANCE FOR AN APPLICATION SYNCHRONIZATION SERVICE

(71) Applicant: Amazon Technologies, Inc., Seattle, WA (US)

(72) Inventors: Jeffrey H. Bailey, Seattle, WA (US); Ruo Qi Hu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/027,313

(22) Filed: Sep. 21, 2020

(51) Int. Cl.
*H04L 67/55* (2022.01)
*H04L 41/069* (2022.01)
*H04L 67/00* (2022.01)
*H04L 67/1095* (2022.01)

(52) U.S. Cl.
CPC ............ *H04L 67/55* (2022.05); *H04L 41/069* (2013.01); *H04L 67/1095* (2013.01); *H04L 67/34* (2013.01)

(58) Field of Classification Search
None
See application file for complete search history.

(56) References Cited

U.S. PATENT DOCUMENTS

| 7,324,535 B1 * | 1/2008 | Goss ........................ H04L 45/50 370/230 |
| 2006/0184675 A1 * | 8/2006 | Salmre .................... H04L 67/75 709/227 |
| 2007/0288662 A1 * | 12/2007 | Chen .................... G06F 16/9535 709/247 |
| 2011/0055339 A1 * | 3/2011 | Lobban ................ G06Q 10/107 709/206 |
| 2015/0163176 A1 * | 6/2015 | Bauer ..................... G06F 9/545 709/232 |
| 2016/0071333 A1 * | 3/2016 | Haidar ................... G07C 5/008 701/29.3 |
| 2018/0039521 A1 * | 2/2018 | White ...................... G06F 9/54 |
| 2019/0014188 A1 * | 1/2019 | Schreter ................ G06F 3/0631 |
| 2022/0329392 A1 * | 10/2022 | Cai ........................ H04L 5/0055 |

FOREIGN PATENT DOCUMENTS

| CN | 104092767 A | * | 10/2014 |
| CN | 109245935 A | * | 1/2019 |
| CN | 111131501 A | * | 5/2020 |
| CN | 112333115 A | * | 2/2021 |
| EP | 1868351 A1 | * | 12/2007 ............ H04L 67/06 |
| KR | 20150124592 A | * | 11/2015 |

* cited by examiner

*Primary Examiner* — Ario Etienne
*Assistant Examiner* — Mohammad Yousuf A. Mian
(74) *Attorney, Agent, or Firm* — NICHOLSON DE VOS WEBSTER & ELLIOTT LLP

(57) ABSTRACT

Techniques for delivery guarantee compliance for an application synchronization service are described. In certain embodiments, a publishing service utilizes its memory queue to receive a request to publish a notification of a modification of a monitored data source from an application synchronization service, and then sends a success code to the application synchronization service based at least in part on the storing of the request to publish the notification in the memory queue. Embodiments herein are directed to a publishing service that delivers messages with a level one Quality of Service (QOS) that indicates that a message will be delivered one time at least.

21 Claims, 13 Drawing Sheets

DELIVERY GUARANTEE COMPLIANCE FOR AN APPLICATION SYNCHRONIZATION SERVICE

BACKGROUND

Enterprises are generating and utilizing more data than ever before. It may be desirable to share this data with other users and/or applications.

BRIEF DESCRIPTION OF DRAWINGS

Various embodiments in accordance with the present disclosure will be described with reference to the drawings, in which.

DETAILED DESCRIPTION

Figure 1:
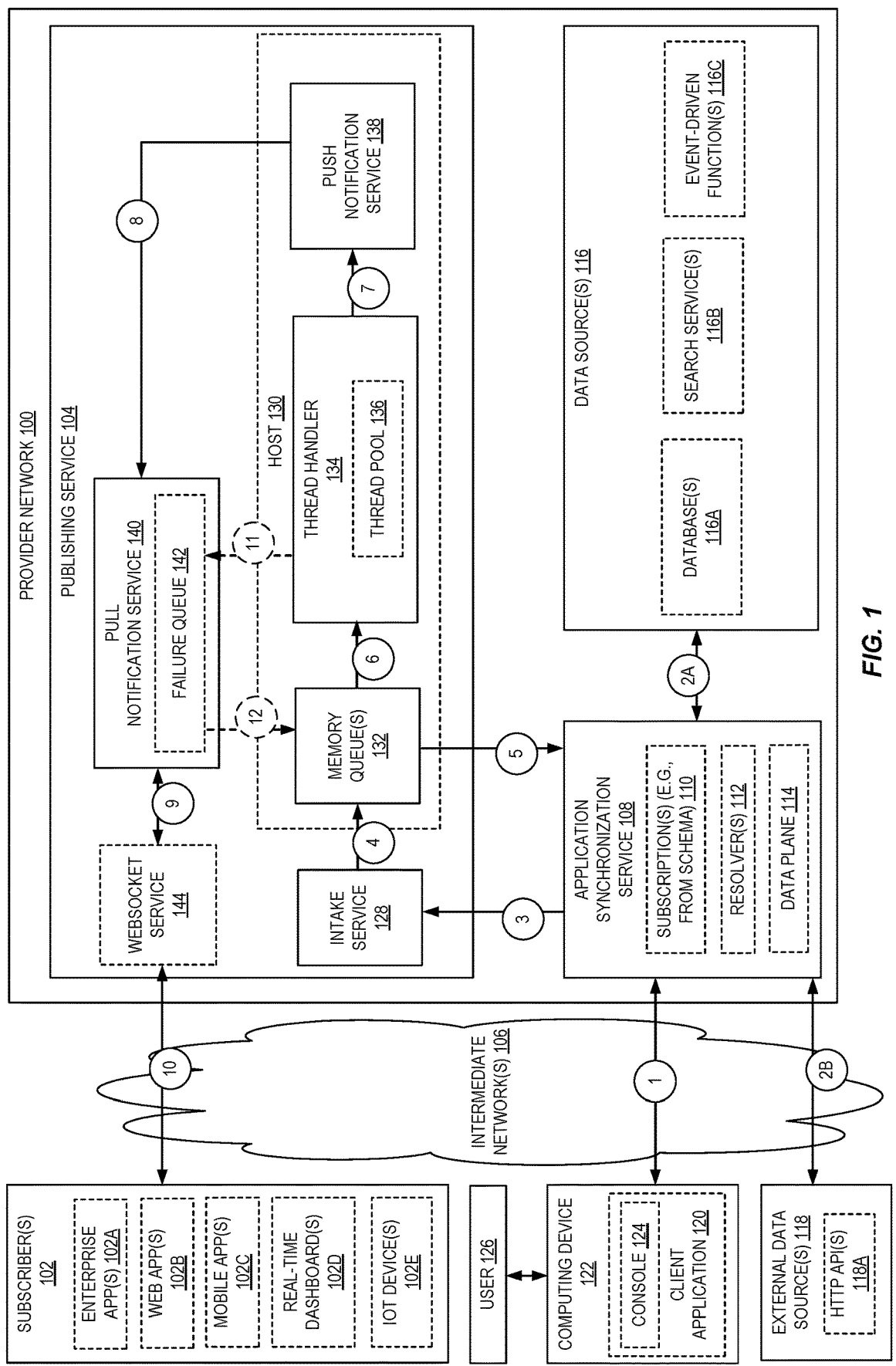
FIG. 1 is a diagram illustrating a first environment for publishing messages for an application synchronization service according to some embodiments.

The present disclosure relates to methods, apparatus, systems, and non-transitory computer-readable storage media for delivery guarantee compliance for an application synchronization service. In certain embodiments, an application synchronization service detects a modification (e.g., mutation) to a monitored data source (e.g., database) and causes a notification of the modification to be sent to a set of one or more subscribers. In certain embodiments, a computer-implemented publishing service is utilized to perform the publishing of the notification of the modification to the set of one or more subscribers, e.g., without requiring the application synchronization service to manage the publishing (or delivery) of the notification.

Messages may be delivered according to one or more standards, for example, a Message Queuing Telemetry Transport (MQTT) standard. In one embodiment, a MQTT standard includes a level zero quality of service (QOS) that indicates (e.g., guarantees) that a message will be delivered one time at most, a level one QOS that indicates (e.g., guarantees) that a message will be delivered one time at least, and a level two QOS that indicates (e.g., guarantees) that a message will be delivered one time exactly.

Certain embodiments herein are directed to a publishing service that provides a certain (e.g., level one) quality of service (QOS) according to a (e.g., MQTT) standard for published messages (e.g., notifications). In one embodiment, a publishing service receives a request to publish a notification for a modification of a data source that has occurred and sends that request to a publishing service to publish the notification of the modification to its subscribers. Embodiments herein: (i) do not negatively impact end to end message delivery latency, (ii) do not negatively impact total message delivery throughput, (iii) lower the risk of a message failing to be delivered, (iv) add minimal operational overhead and test complexity. (v) do not prevent a publishing service from being a standalone application, (vi) do not prevent a publishing service from being de-coupled from an application synchronization service, or any combination thereof. In one embodiment, the QOS is a level one, for example, where QOS level zero is the fastest but where a publishing service not delivering messages is unacceptable, and where QOS level two has an unacceptable latency overhead, such that QOS level one is the best balance between message delivery success and speed. In one embodiment, it is desired to have a QOS level one, instead of having messages that may be delivered multiple times but may also be delivered zero times. Certain embodiments herein thus avoid the non-delivery case to reach a full QOS level one.

To achieve QOS level one compliance, certain embodiments herein utilize a hierarchical distributed system that leveraged parallelization and reduction of thread and memory contention, for example, while also increasing in-service throughput with a minimal impact in end to end latency. In certain embodiments, dependent service outages are mitigated by leveraging a push notification service as a (e.g., centralized) failure queue for all (e.g., publishing) hosts to use.

FIG. 1 is a diagram illustrating a first environment for publishing messages for an application synchronization service 108 according to some embodiments. FIG. 1 includes a publishing service 104 coupled to application synchronization service 108. Publishing service 104, application synchronization service 108, intake service 128, push notification service 138, and pull notification service 140 may be implemented via software, hardware, or a combination of both, and may be implemented in a distributed manner using multiple different computing devices (e.g., hosts).

In certain embodiments, application synchronization service 108 allows for (e.g., user 126) creation and interaction with data source(s) 116 and/or data source(s) 118, e.g., by using a data query and manipulation language, such as, but not limited to, GraphQL. In one embodiment, data source(s) 118 are external from data sources 116, e.g., data source(s) 118 are not within provider network 100. Data source(s) 118 may be accessed by a Hypertext Transfer Protocol (HTTP) application programming interface (API) 118A. Data source (s) 116 may include database(s) 116A (e.g., non-relational databases and/or relational databases), search services 116B, and/or event-driven functions 116C.

In certain embodiments, application synchronization service 108 allows one or more subscribers 102 to read, write (e.g., mutate), and/or subscribe to changes to data sources (e.g., real time updates of the changes). Subscribers 102 may include one or more enterprise applications 102A, one or more web applications 102B, one or more mobile applications 102C, one or more real-time dashboards 102D, one more Internet of Things (IOT) devices 102E, or any combination thereof. In certain embodiments, application synchronization service 108 includes subscriptions 110 (e.g., indicating which data source(s) 116 and/or 118 are monitored for mutations and/or which subscriber(s) 102 are to be updated with the mutations. In certain embodiments, application synchronization service 108 includes resolver(s) 112, e.g., as one or more functions that convert the (e.g., GraphQL) payload to the underlying storage system protocol and execute if the caller is authorized to invoke it. In one embodiment, resolvers are comprised of request and response mapping templates, e.g., which contain transformation and execution logic. In certain GraphQL embodiments, each GraphQL API is defined by a single GraphQL schema, for example, where the GraphQL Type system describes the capabilities of a GraphQL server and is used to determine if a query is valid. A server's type system may be referred to as that server's schema, e.g., made up of a set of object types, scalars, input types, interfaces, enums, and unions. In certain embodiments, the schema defines the shape of the data that flows through the API and the operations that can be performed. In certain embodiments, all data operations are validated against the corresponding schema. In certain GraphQL embodiments, resolvers connect the fields in a type's schema to a data source, e.g., such that resolvers are the mechanism by which requests are fulfilled. In certain embodiments, application synchronization service 108 includes data plane 114, e.g., that sends a request to publish a notification of a modification, e.g., sends the request to publishing service 104.

FIG. 1 also includes a push notification (e.g., messaging) service 138 and a pull notification (e.g., messaging) service 140. In certain embodiments, push notification service 138 allows applications to send time-critical messages to multiple subscribers through a push mechanism, e.g., eliminating the need to periodically check or poll for updates. In certain embodiments, pull notification service 140 is a message queue service used by distributed applications to exchange messages through a polling model, and can be used to decouple sending and receiving components, for example, to provide flexibility for distributed components of applications to send and receive messages without requiring each component to be concurrently available (e.g., powered on or connected to the internet). In certain embodiments, push notification service 138 is used to push messages to pull notification service 140 (e.g., a queue thereof) to reliably send messages to one or more system components asynchronously. Although shown within publishing service 104 in FIG. 1, push notification service 138 and/or pull notification service 140 may be separate from publishing service 104, e.g., but still within provider network 100.

As one example, a first flow path includes application synchronization service 108 sending a message (e.g., a message indicating a request from the application synchronization service 108 to publish a notification of a mutation in a monitored data source 116/118) to publishing service 104, and publishing service 104 is to send that message to push notification service 138. In certain embodiments, the first flow path is the riskiest path for losing messages. In this example, a second flow path includes push notification service 138 sending the message to pull notification service 140, e.g., with any failures on this path being handled by the first flow path. In this example, the third flow path includes the flow from the pull notification service 140 to (e.g., millions of) subscribers 102 (e.g., end clients), for example, with any publishing failures in the third flow path being acceptable.

Certain embodiments herein make the message delivery flow asynchronous by utilizing an in-memory queue 132 (e.g., on each host 130), for example, to improve at least the first flow path in the example above. Additionally, for redundancy, certain embodiments herein leverage the pull notification service 140 as a failure (e.g., fallback) queue 142. Certain embodiments herein make a publish mutation API (e.g., PublishTextMutation API) asynchronous by splitting it into two parts, e.g., the first part (e.g., synchronously) taking the request (e.g., as shown at circle (3)) to publish from the application synchronization service 108 and dropping it into a memory queue 132 of publishing service 104, and the second part reading from that queue and processing a batch of requests (e.g., in parallel), e.g., causing them to be sent to push notification service 138. In certain embodiments, the storing of the request into the memory queue 132 causes the publishing service to send a success code (e.g., as shown at circle (5)) to the application synchronization service 108, e.g., such that application synchronization service 108 has now completed its operations for that request. In one embodiment, the success code is a (e.g., level one) quality of service (QOS) success code according to a Message Queuing Telemetry Transport (MQTT) standard, for example, a "200" code. Utilizing memory queue 132 thus allows for minimal overhead to mutation flow for application synchronization service 108, allows for a safe retry policy on the application synchronization service 108 side to get the message out and quickly (for example, in less than one second, e.g., in less than one or a plurality of milliseconds less than a second), adds minimal operational overhead, and/or effectively adds retries to the publish flow, e.g., without adding any latency. Certain embodiments herein thus utilize one or more memory queues 132 to avoid overwhelming the resources of push notification service 138. One or more of the above services may be provided by provider network 100.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service), a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console 124 implemented as a website or application, etc. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service (which may be one of compute service(s)) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a particular data source(s) monitored by the application synchronization service 108. Thereafter, at circle (2A) and circle (2B), respectively, a modification to data source 116 and/or data source 118 is detected in this example use, and application synchronization service 108 sends a request at circle (3) to publishing service 104. In one embodiment, an intake service 128 receives the request (or a message based on the request) and stores it at circle (4) into an available memory queue 132. In this example use, publishing service 104 then sends a success code (e.g., "200" code) at circle (5) to application synchronization service 108. Application synchronization service 108 may then continue to service other subscriptions/modifications. Thereafter, at circle (6), a thread handler 134 of host 130 of publishing service 104 (e.g., when a processing thread of thread pool 136 is available) begins operating on the request (or a message based on the request) and, at circle (7) sends the request (or a message based on the request) to push notification service 138, and removes the request (or a message based on the request) from memory queue 132. That empty slot in memory queue 132 may now be used for an additional request from application synchronization service 108. Thereafter, at circle (8), push notification service is to push the request (or a message based on the request) to pull notification service 140, and subscribers may then pull, at circle (10), that request (e.g., the notification of the mutation corresponding to the request) from pull notification service 140, e.g., via WebSocket service 144 at circle (9). In certain embodiments, a batch of requests are simultaneously accessed from memory queue at circle (6). In one embodiment, each thread handles multiple requests in parallel (e.g., about 200 requests in a second). In one embodiment, each host has multiple threads (e.g., a single host having 50 parallel threads).

In certain embodiments, the application synchronization service 108 (e.g., API thereof) includes a retry policy that is appropriate for its API being asynchronous. For example, instead of application synchronization service 108 not performing a retry of sending a request (e.g., at circle (3)) when the publishing service 104 fails to send a success code or performing only a single retry (e.g., after a five second timeout), certain embodiments herein perform multiple retry attempts (e.g., at circle (3)), for example, a plurality of retries within a threshold period of time.

In certain embodiments, the publishing service 104 (e.g., API thereof) takes the incoming request at circle (3) and stores it in local memory queue 132. Certain embodiments support large variances in message sizes, for example, if two hosts have ten thousand messages in their queues, the total size could be hugely variable. To that end, certain embodiments herein set a cap of some size for total memory that each host can have consumed in this, e.g., and if the queue has exceeded this size, then the service will return a retry code (e.g., "500" code) to the caller. This will serve as a mechanism to failover and cause a retry, e.g., that should try to hit another host. Certain embodiments have alarms on this size on the service side to detect if the queue(s) are approaching too full and unable to handle requests.

Rather than commit to tracking a total queue size that would be updated by (e.g., hundreds of) parallel threads on both sides, certain embodiments herein assume a maximum message size every time, commit to a maximum total size from there, and work backwards to a max number of items, for example, with 1000 total items (e.g., requests) allowing for a total of 256 MB of queues.

Certain embodiments herein utilize several distributed queues, rather than just one, for example, with memory queue 132 being a plurality of memory queues. Having a plurality (e.g., hundreds) of threads all polling a single queue may cause locking/contention issues from each thread fighting over one memory location. Certain embodiments herein utilize multiple queues 132 (e.g., about 10) for each host 130 (e.g., and each host having a plurality of threads (e.g., divided into different shards of threads) in thread pool 136). In one embodiment, when interacting with these queues, a host tries to enqueue to a random one of the plurality and, if space allows, the item (e.g., request) would be enqueued and a success code (e.g., "200" code) returned to application synchronization service 108, and, if not, host 130 would try one or more times to enqueue the item (e.g., request) into another queue of the plurality of queues 132, e.g., and if, it not successful, return a retry code (e.g., "500" code) to the calling client (application synchronization service 108) and trigger a retry on a different host (e.g., as discussed further in reference to FIG. 2 below) and/or a different shard of a same host. Thus, certain embodiments herein effectively build a hierarchical failover system over the distributed queues for the system, with a total number of (e.g., 15) attempts to enqueue for the application synchronization service 108 caller (e.g., which has a base number of (e.g., 5) retry attempts. In one embodiment, each host is split into multiple (e.g., about ten) shards, for example, with each shard having its own instance of memory queue(s) 132, thread handler 134 (e.g., thread pool 136 of that shard), and/or push notification service 138 (e.g., a thread pool thereof of that shard).

In addition to one or more memory queues 132, certain embodiments herein utilize a failure queue 142. In one embodiment, when a request fails through all retries to publish to push notification service 138, the publishing service 104 asynchronously stores the request at circle (11) into the failure queue 142 in pull notification service 140. In certain embodiments, all hosts have one or more threads of thread pool 136 dedicated to polling that queue, and when any gets a response, they will merge it into their local memory queue 132, e.g., at circle (12). In one embodiment, all items merged in will have their pull notification service 140 message identification (ID) saved, so they can then be deleted from pull notification service 140 (e.g., failure queue 142) when processed. In one embodiment, the logic around processed time being capped will serve as a self-pruning mechanism for the failure queue 142, e.g., as it does for memory queues 132. Thus, in certain embodiments, no dead letter queue (DLQ) is needed as it is handled locally. In one embodiment, pull notification service 140 (e.g., failure queue 142 has a visibility timeout (e.g., of a few seconds) to ensure multiple hosts do not process the same message at the same time. As it is a centralized store, in certain embodiments there is no need for resource mapping or an origin ID of any kind. For example, where a first host can handle a failed message from a second, different host, e.g., as discussed in reference to FIG. 2 below.

In one embodiment, the publishing service 108 runs on a cloud-computing platform that is backed by a host-independent storage, e.g., so the host shutting down does not lose the data. In one embodiment, the publishing service 108 runs on a cloud-computing platform but uses a remote file system for subscriber interactions, e.g., uses pull notification service 140.

Figure 2:
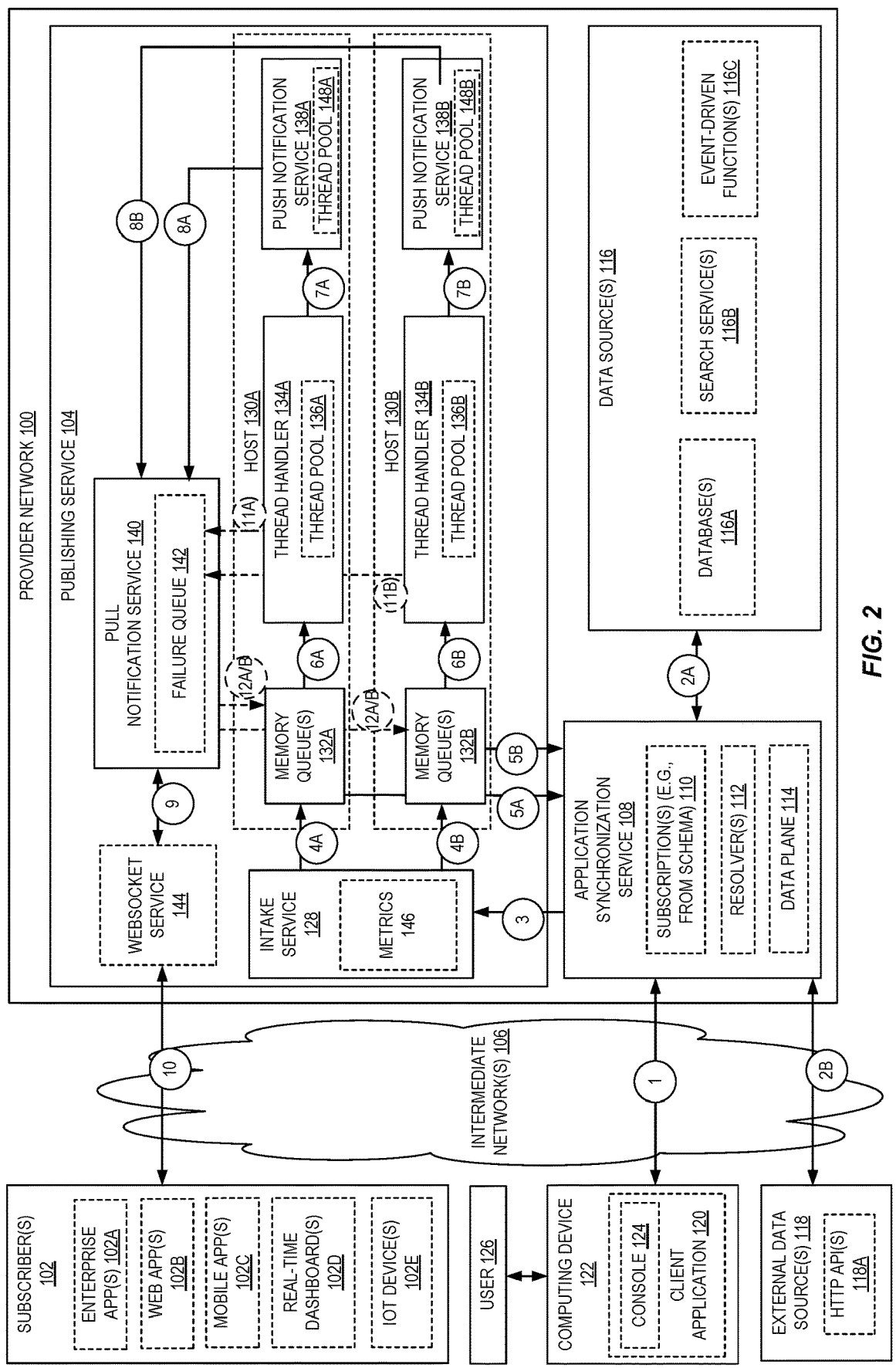
FIG. 2 is a diagram illustrating a second, multiple host environment for publishing messages for an application synchronization service according to some embodiments.

FIG. 2 is a diagram illustrating a second, multiple host environment for publishing messages for an application synchronization service according to some embodiments. FIG. 2 includes a first host 130A and a second host 130B, although it should be understood that any plurality of hosts may be utilized. In addition to one or more memory queues 132A and 132B, respectively for hosts 130A and 130B, certain embodiments herein utilize a failure queue 142. In certain embodiments, when a request fails through all retries to publish to push notification service 138, the publishing service 104 asynchronously stores the request at circle (11A) and/or circle (11B) into the failure queue 142 in pull notification service 140. In certain embodiments, all hosts 130A-130B have one or more threads of thread pool 136A and 136B, respectively dedicated to polling that queue, and when any gets a response, they will merge it into their local memory queue 132A or 132B, e.g., at circle (12A) or circle (12B), respectively. In one embodiment, host 130A is a first (e.g., logical) shard of a single (e.g., physical) host and host 130B is a second (e.g., logical) shard of the single (e.g., physical) host. In certain embodiments, a plurality of hosts that are each sharded are utilized.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a data source monitored by the application synchronization service 108. In one embodiment, the subscription 110 is uploaded via websocket service 144. Thereafter, at circle (2A) and circle (2B), respectively, a modification to data source 116 and/or data source 118 is detected in this example use, and application synchronization service 108 sends a request at circle (3) to publishing service 104. In certain embodiments, an intake service 128 receives the request (or a message based on the request) and stores it at circle (4A) into an available memory queue 132A or circle (4B) into an available memory queue 132B. In this example use, publishing service 104 then sends a success code (e.g., "200" code) at circle (5A) and circle (5B), respectively to application synchronization service 108. Application synchronization service 108 may then continue to service other subscriptions/modifications. Thereafter, at circle (6A), a thread handler 134A of host 130A of publishing service 104 (e.g., when a processing thread of thread pool 136A is available) begins operating on the request (or a message based on the request) and, at circle (7A) sends the request (or a message based on the request) to push notification service 138A (e.g., for operation on by thread pool 148A), and removes the request (or a message based on the request) from memory queue 132A. That empty slot in memory queue 132A may now be used for an additional request from application synchronization service 108. Thereafter, at circle (8A), push notification service 138A is to push the request (or a message based on the request) to pull notification service 140, and subscribers may then pull, at circle (10), that request (e.g., the notification of the mutation corresponding to the request) from pull notification service 140, e.g., via WebSocket service 144 at circle (9). At circle (6B), a thread handler 134B of host 130B of publishing service 104 (e.g., when a processing thread of thread pool 136B is available) begins operating on the request (or a message based on the request) and, at circle (7B) sends the request (or a message based on the request) to push notification service 138B (e.g., for operation on by thread pool 148B), and removes the request (or a message based on the request) from memory queue 132B. That empty slot in memory queue 132B may now be used for an additional request from application synchronization service 108. Thereafter, at circle (8B), push notification service 138B is to push the request (or a message based on the request) to pull notification service 140, and subscribers may then pull, at circle (10), that request (e.g., the notification of the mutation corresponding to the request) from pull notification service 140, e.g., via WebSocket service 144 at circle (9). In certain embodiments, a batch of requests are simultaneously accessed from memory queue at circle (6A) and circle (6B).

In certain embodiments, a single host 130A or 130B is held out of receiving additional requests to instead service requests within failure queue 142, e.g., until failure queue 142 is empty.

To monitor this effectively, certain embodiments herein have fault alarms for the enqueueing process and maintains queue size metrics 146 that will show queue sizes on each host 130A-130B. These metrics 146 allow for visibility of trends over time and may be used as an auto scaling alarm for the publishing service 104.

In certain embodiments, memory queue 132 is a class of queue that backs up any changes to a data store, has custom constraints that it is built around it, and those can be changed. In one embodiment, class of memory queue 132 is a decorator pattern in object-oriented programming (e.g., where all classes handle a request).

In certain embodiments, the processing of messages by publishing service 104 is based on adjustable configurations, so it may be desirable to reconfigure the (e.g., processing rate) configurations in a way that leaves processing slower than message intake. That may lead to a very high fault rate and a disastrously unavailable service. To that end, metrics 146 on queue sizes, in progress requests, success rates, and all sorts of other interactions with the queue. In certain embodiments, the configurations are saved in a safe dynamic configuration (SDC) such that they can be resolved without a deploy in case there is an issue (e.g., undesirable fault rate and/or undesirable unavailability of service).

Example configuration settings include: (i) number of hosts (e.g., per availability zone), (ii) total threads per host (e.g., to meet a threshold response time), (iii) number of threads dedicated to polling failure queue 142 (e.g., polling at equal intervals across a time period), (iv) number of threads dedicated to saving to/deleting from failure queue (e.g., an asynchronous thread pool for these interactions to avoid impacting latency), (v) number of threads dedicated to polling a local memory queue (e.g., 132 or 132A/132B) (for example, a thread pool dedicated to reading its queue(s), e.g., over equal intervals of time, (e.g., every 20 milliseconds)), (vi) number of threads dedicated to incoming requests (e.g., threads of intake service 128), or any combination thereof.

Referring to both FIGS. 1 and 2, in certain embodiments the publishing service 104 is thus to drain each queue (e.g., memory queue 132 in FIG. 1 and memory queues 132A and 132B in FIG. 2). In certain embodiments, a queue is drained (e.g., requests are processed) with a dedicated, fixed size thread pool (e.g., thread pool 136 in FIG. 1 for queue 132, thread pool 136A in FIG. 2 for queue 132A, and thread pool 136B in FIG. 1 for queue 132B) that will poll its queue(s) (e.g., multiple times a second) to get batches off requests therefrom. In certain embodiments, each of those threads will poll a fixed size batch of requests, then iteratively try to publish each request to push notification service (e.g., push notification service 138 in FIG. 1, push notification service 138A for host 130A in FIG. 2, and push notification service 138B for host 130B in FIG. 2), for example, according to a retry policy. Depending on the batch size, this can be split up into separate threads to each handle a smaller proper subset of requests, e.g., to also provide freedom to have even more retries applied. Certain embodiments herein are to not send messages beyond a time threshold after they have been received from the application synchronization service 108. Embodiments herein allow for the setting of this time threshold (e.g., fifteen minutes). Then, as the thread handler is iterating over the messages it received from the queue, it will drop/delete anything that has been held longer than the threshold allows in certain embodiments, e.g., to would prevent mass overload of dumping in case of any downstream outage. In one embodiment, when (e.g., all) retries have failed, requests may be sent into the failure queue 142 asynchronously, for example, with queue 132 to read from the failure queue 142 and merge a failed request in with incoming requests for later handling.

Certain embodiments herein include a custom queue class for memory queues 132 that for enqueues and dequeues to enforce queue size limitations and a cap on time to deliver messages. This queue may be used as the intake for incoming requests, and as the queue for the thread executor that fanned out requests to push notification service 138. In certain embodiments, this allows push notification service 138 publishes to be done in parallel, rather than synchronously, for example, to provide substantially improved throughput and/or allow multiple retry attempts to push notification service 138 without impacting other customers.

In certain embodiments, having several different queues publishing to the same push notification service 138 client meant fighting for the same connection pool, to mitigate this, certain embodiments separate clients per queue, e.g., so each had their own push notification service 138 client to leverage, for example, push notification service 138A for memory queue 132A and push notification service 138B for memory queue 132B.

Figure 3:
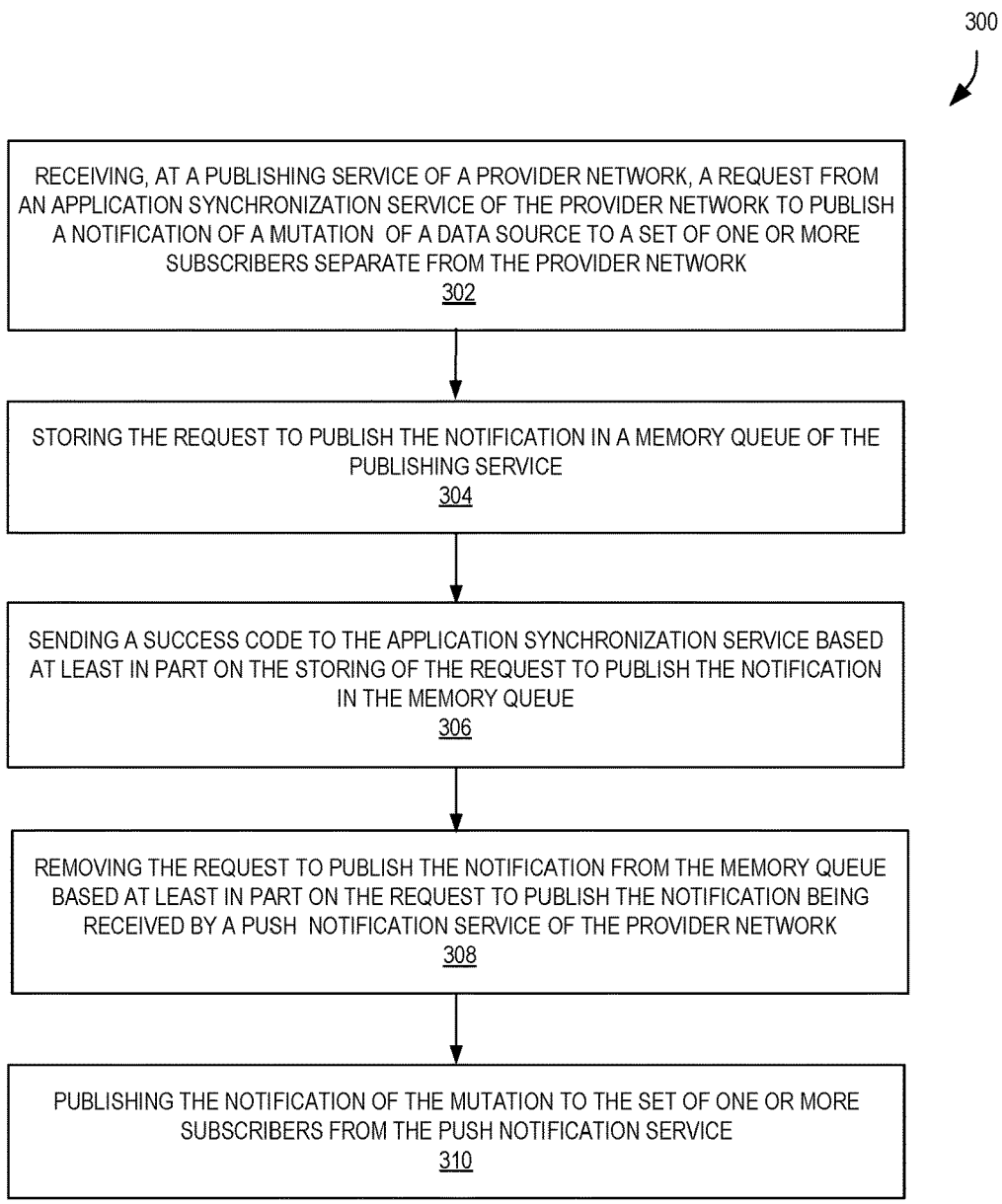
FIG. 3 is a flow diagram illustrating operations of a method for publishing a notification of a mutation from an application synchronization service to a set of one or more subscribers according to some embodiments.

FIG. 3 is a flow diagram illustrating operations 300 of a method for publishing a notification of a mutation from an application synchronization service to a set of one or more subscribers according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by publishing service 104 (e.g., implemented in a provider network) of the other figures.

The operations 300 include, at block 302, receiving, at a publishing service of a provider network, a request from an application synchronization service of the provider network to publish a notification of a mutation of a data source to a set of one or more subscribers separate from the provider network. The operations 300 further include, at block 304, storing the request to publish the notification in a memory queue of the publishing service. The operations 300 further include, at block 306, sending a success code to the application synchronization service based at least in part on the storing of the request to publish the notification in the memory queue. The operations 300 further include, at block 308, removing the request to publish the notification from the memory queue based at least in part on the request to publish the notification being received by a push notification service of the provider network. The operations 300 further include, at block 310, publishing the notification of the mutation to the set of one or more subscribers from the push notification service.

Other environments for publishing message are described below in reference to FIGS. 4-8.

Figure 4:
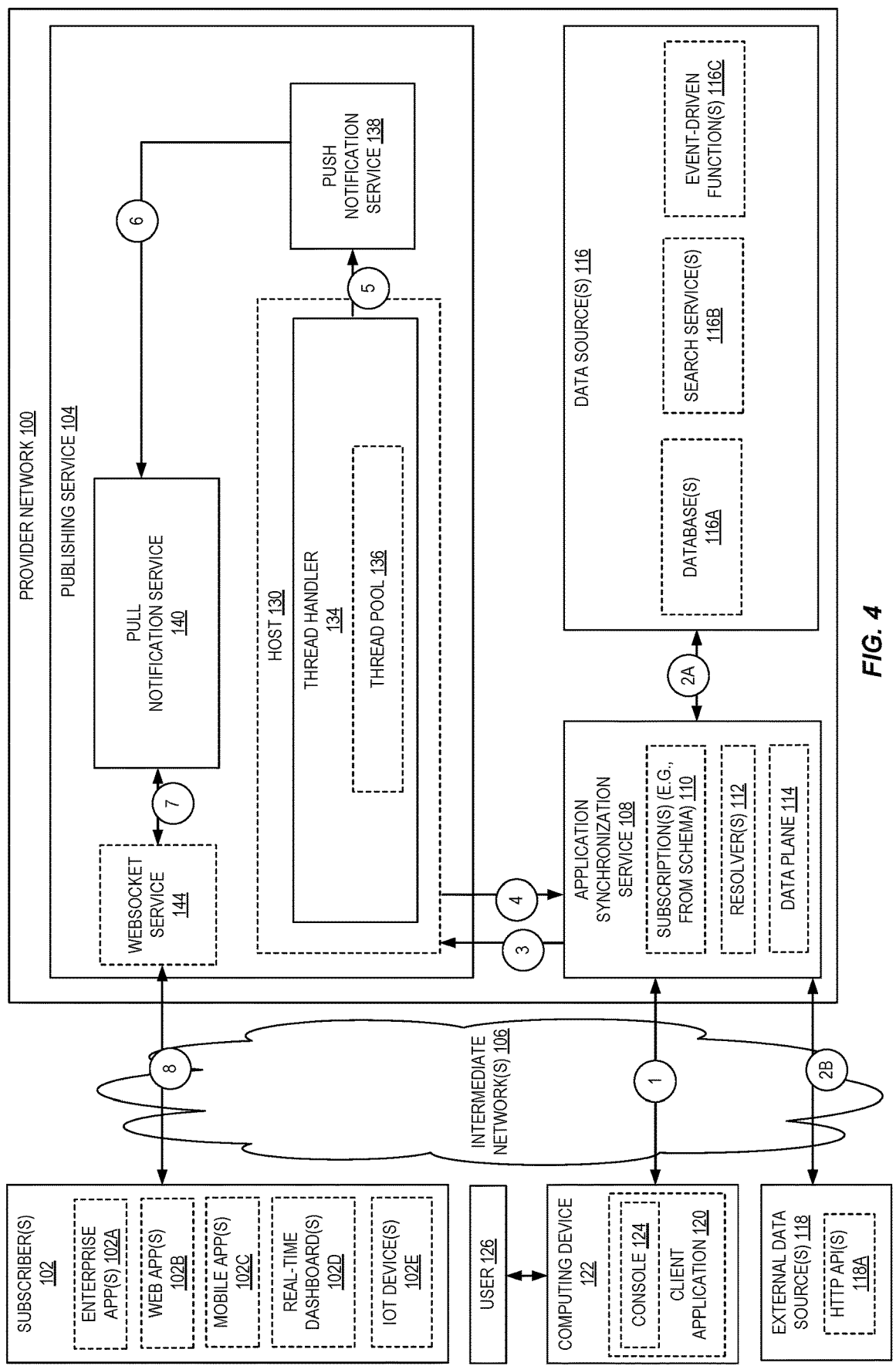
FIG. 4 is a diagram illustrating a third environment for publishing messages for an application synchronization service according to some embodiments.

FIG. 4 is a diagram illustrating a third environment for publishing messages for an application synchronization service 108 according to some embodiments. In certain embodiments, a request to publish a notification received by the publishing service 104 from the application synchronization service 108 is asynchronous such that a success code (e.g., "200" value) is sent back to application synchronization service 108 when publishing service 104, for example, but the subscribers have not necessarily each received the notification (e.g., where publishing service 104 is to retry storing the request in the push notification service 138.

These embodiments thus allow for minimal overhead to mutation flow for application synchronization service 108, allow for a safe retry policy on application synchronization service 108 side to get the message out and quickly, and/or add minimal operational overhead. However, certain of these embodiments may cause long-running threads, which could eat up resources heavily and/or code deployments could cause messages to be dropped en masse.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a data source monitored by the application synchronization service 108. In one embodiment, the subscription 110 is uploaded via websocket service 144. Thereafter, at circle (2A) and circle (2B), respectively, a modification to data source 116 and/or data source 118 is detected in this example use, and application synchronization service 108 sends a request at circle (3) to publishing service 104. In this example use, publishing service 104 (e.g., host 130 thereof) then sends a success code (e.g., "200" code) at circle (4) to application synchronization service 108. Application synchronization service 108 may then continue to service other subscriptions/modifications. Thereafter, at circle (5), publishing service 104 (e.g., host 130 thereof) sends the request (or a message based on the request) to push notification service 138. Thereafter, at circle (6), push notification service is to push the request (or a message based on the request) to pull notification service 140, and subscribers may then pull, at circle (8), that request (e.g., the notification of the mutation corresponding to the request) from pull notification service 140, e.g., via WebSocket service 144 at circle (7).

Figure 5:
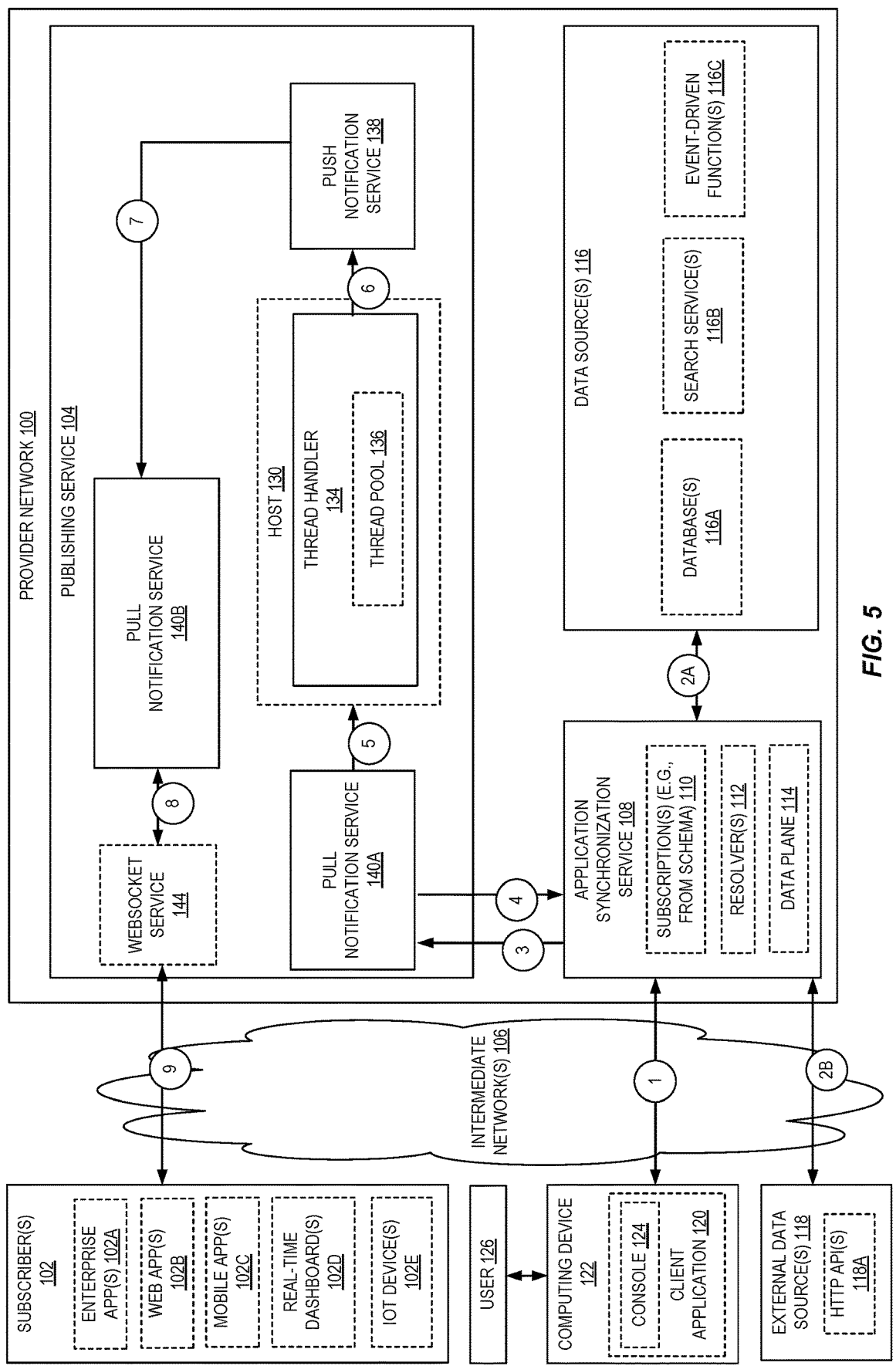
FIG. 5 is a diagram illustrating a fourth environment for publishing messages for an application synchronization service according to some embodiments.

FIG. 5 is a diagram illustrating a fourth environment for publishing messages for an application synchronization service 108 according to some embodiments. In certain embodiments, a request to publish a notification received by the publishing service 104 from the application synchronization service 108 uses pull notification service 140A (e.g., a queue thereof) as an intermediate, then updates publishing service (e.g., host 130 thereof) to poll from pull notification service 140A (e.g., a queue thereof), e.g., with a dedicated thread pool and/or a fixed rate.

These embodiments thus allow for minimal overhead to mutation flow for application synchronization service 108, allow for a safe retry policy on application synchronization service 108 side to get the message out and quickly, and/or polling that allows batch actions rather than individual actions to improve throughput. However, certain of these embodiments may cause additional overhead to publish time, additional operational overhead, and/or restrict the publishing service 104 from being a standalone service.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a data source monitored by the application synchronization service 108. In one embodiment, the subscription 110 is uploaded via websocket service 144. Thereafter, at circle (2A) and circle (2B), respectively, a modification to data source 116 and/or data source 118 is detected in this example use, and application synchronization service 108 sends a request at circle (3) to pull notification service 140A (e.g., a queue thereof). In this example use, pull notification service 140A then sends a success code (e.g., "200" code) at circle (4) to application synchronization service 108. Application synchronization service 108 may then continue to service other subscriptions/modifications. Thereafter, at circle (5), pull notification service 140A sends the request (or a message based on the request) to publishing service 104 (e.g., host 130 thereof). Thereafter, at circle (6), publishing service 104 (e.g., host 130 thereof) sends the request (or a message based on the request) to push notification service 138, and push notification service 138 is to push the request (or a message based on the request) at circle (7) to pull notification service 140B (e.g., which may be the same instance as pull notification service 140A), and subscribers may then pull, at circle (9), that request (e.g., the notification of the mutation corresponding to the request) from pull notification service 140, e.g., via WebSocket service 144 at circle (8).

Figure 6:
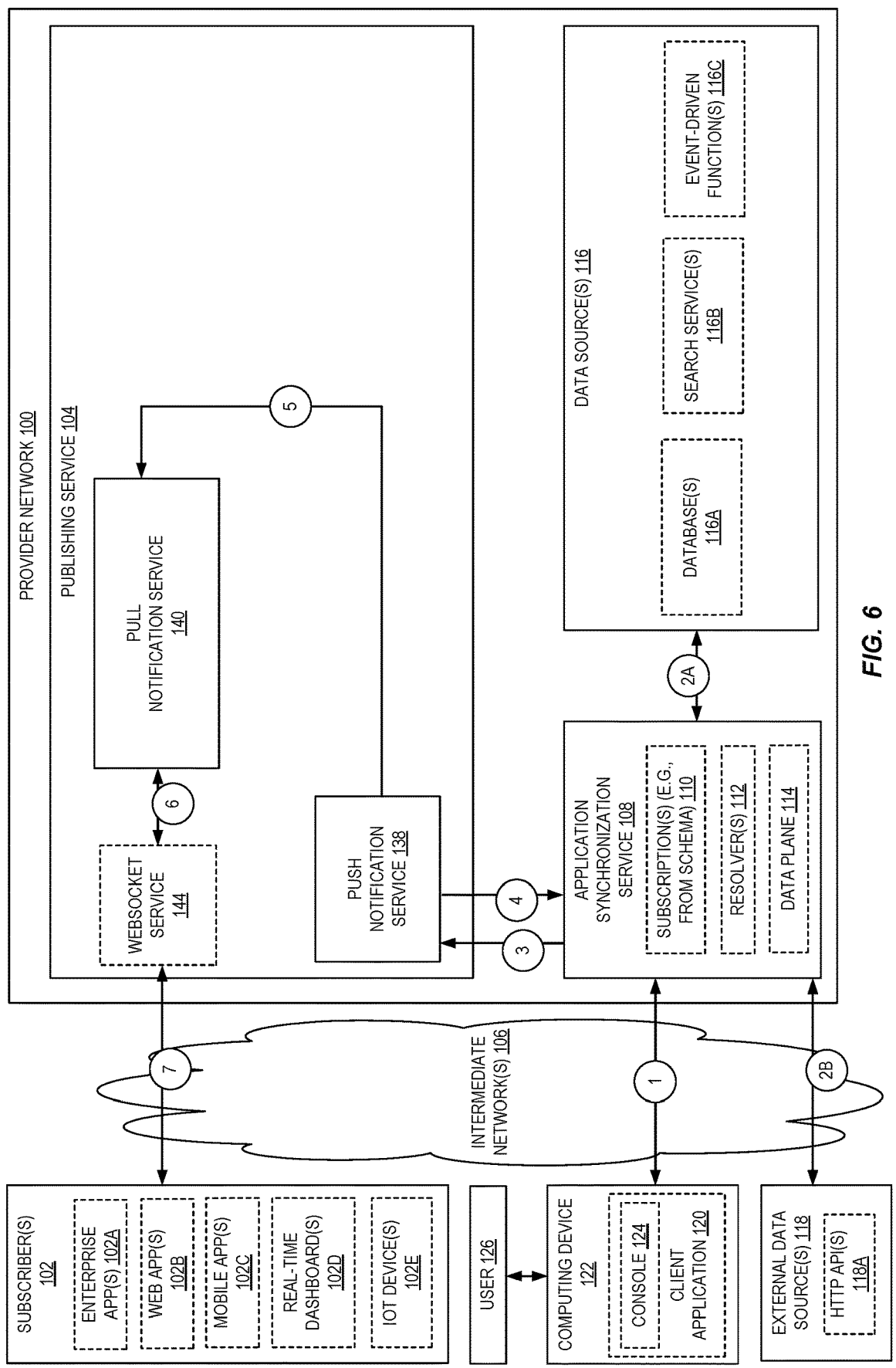
FIG. 6 is a diagram illustrating a fifth environment for publishing messages for an application synchronization service according to some embodiments.

FIG. 6 is a diagram illustrating a fifth environment for publishing messages for an application synchronization service 108 according to some embodiments. In certain embodiments, a request to publish a notification is sent directly from application synchronization service 108 to push notification service 138, e.g., without use of a publishing service.

These embodiments thus allow for fewer points of failure by removing a hop in the flow. However, certain of these embodiments may restrict the publishing service 104 from being a standalone service and/or complicate the separation of work division by the components.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a data source monitored by the application synchronization service 108. In one embodiment, the subscription 110 is uploaded via websocket service 144. Thereafter, at circle (2A) and circle (2B), respectively, a modification to data source 116 and/or data source 118 is detected in this example use, and application synchronization service 108 sends a request at circle (3) to push notification service 138. In this example use, push notification service 138 then sends a success code (e.g., "200" code) at circle (4) to application synchronization service 108. Application synchronization service 108 may then continue to service other subscriptions/modifications. Thereafter, at circle (5), push notification service 138 pushes the request (or a message based on the request) to pull notification service 140, and subscribers may then pull, at circle (7), that request (e.g., the notification of the mutation corresponding to the request) from pull notification service 140, e.g., via WebSocket service 144 at circle (6).

Figure 7:
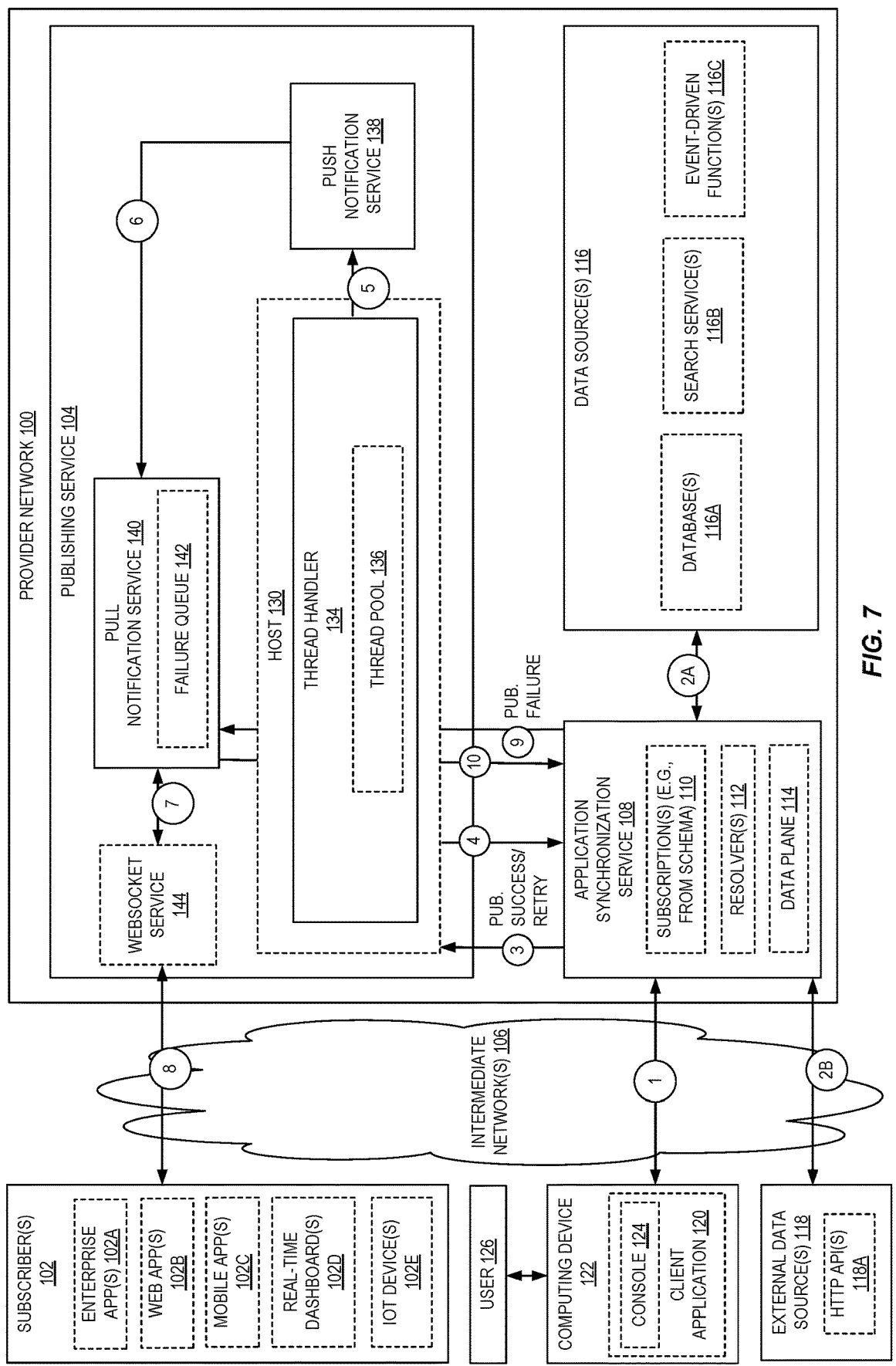
FIG. 7 is a diagram illustrating a sixth environment for publishing messages for an application synchronization service according to some embodiments.

FIG. 7 is a diagram illustrating a sixth environment for publishing messages for an application synchronization service 108 according to some embodiments. In certain embodiments, a request to publish a notification received by the publishing service 104 from the application synchronization service 108 uses pull notification service 140 as a fallback, for example, with the first attempt to send the request from application synchronization service 108 to the publishing service 104 (e.g., host 130 thereof), and the second, subsequent attempt to send the request from application synchronization service 108 to the pull notification service 140 (e.g., failure queue 142 thereof), e.g., with an additional polling mechanism used to process those and send them out again for publishing.

These embodiments thus allow for minimal overhead to mutation flow for application synchronization service 108, allow use of pull notification service 140 (e.g., failure queue 142 thereof) for noisy customer (e.g., ones with multiple attempts to publish the same request), and/or allow for a retry in the publishing flow. However, certain of these embodiments may cause additional operational overhead and/or create confusing flows that are difficult to test.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a data source monitored by the application synchronization service 108. In one embodiment, the subscription 110 is uploaded via websocket service 144. Thereafter, at circle (2A) and circle (2B), respectively, a modification to data source 116 and/or data source 118 is detected in this example use, and application synchronization service 108 sends a request at circle (3) to publishing service 104. In this example use, publishing service 104 (e.g., host 130 thereof) then sends a success code (e.g., "200" code) at circle (4) to application synchronization service 108. Application synchronization service 108 may then continue to service other subscriptions/modifications. Thereafter, at circle (5), publishing service 104 (e.g., host 130 thereof) sends the request (or a message based on the request) to push notification service 138. Thereafter, at circle (6), push notification service is to push the request (or a message based on the request) to pull notification service 140, and subscribers may then pull, at circle (8), that request (e.g., the notification of the mutation corresponding to the request) from pull notification service 140, e.g., via WebSocket service 144 at circle (7). However, for a failure to receive the request from circle (3) by the publishing service 104 (e.g., host 130 thereof), the application synchronization service 108 at circle (9) is to send the request (or a message based on the request) to pull notification service 140 (e.g., failure queue 142 thereof). In this example, at circle (10), application synchronization service 108 polls the pull notification service 140 (e.g., failure queue 142 thereof) for any failed requests, and then causes a retry of the request to publish at circle (3).

Figure 8:
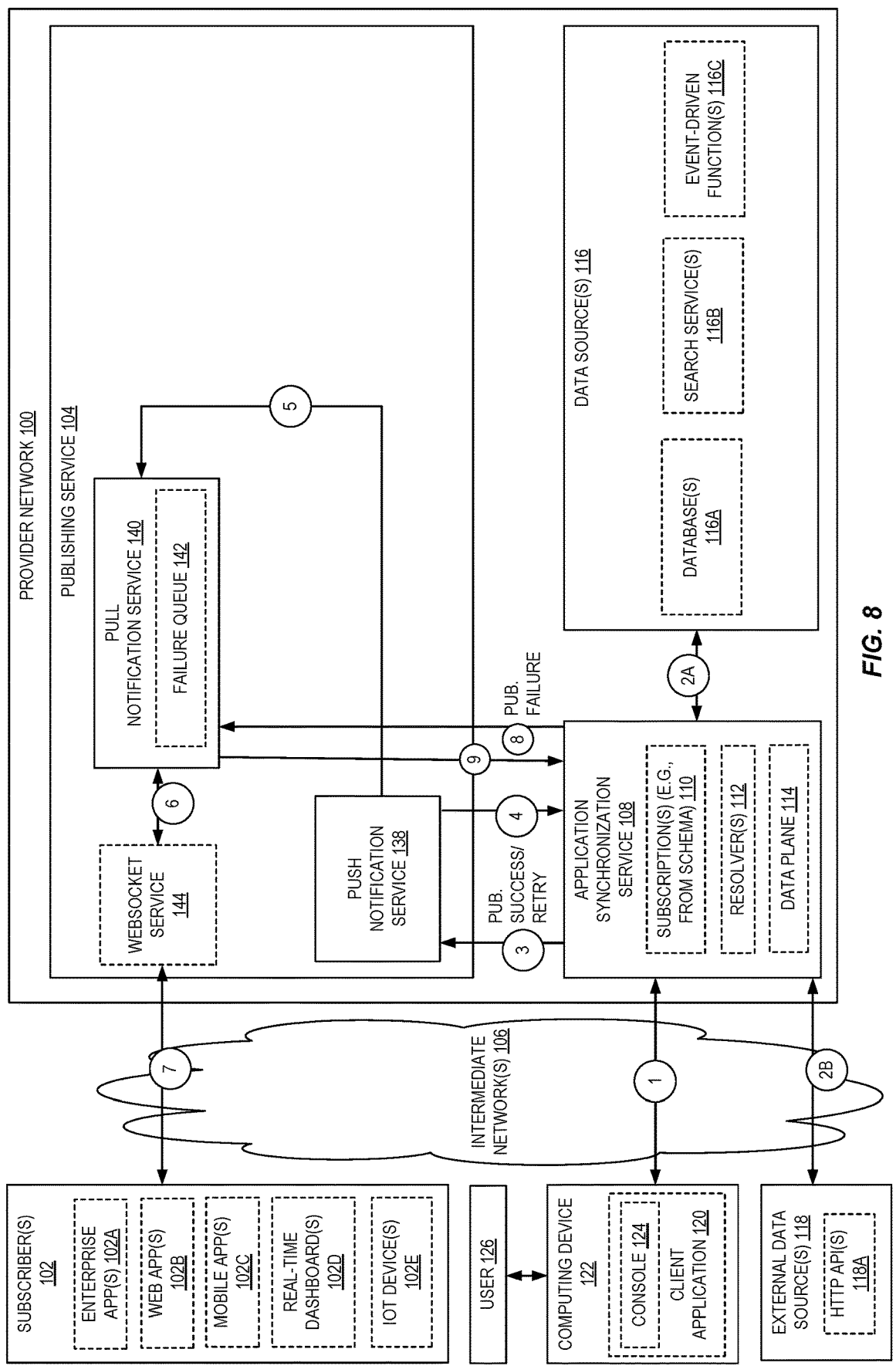
FIG. 8 is a diagram illustrating a seventh environment for publishing messages for an application synchronization service according to some embodiments.

FIG. 8 is a diagram illustrating a seventh environment for publishing messages for an application synchronization service 108 according to some embodiments. In certain embodiments, a request to publish a notification received by the publishing service 104 from the application synchronization service 108, uses direct calls from application synchronization service 108 to push notification service 138, and if there is a failure, the failed request is sent to failure (e.g., fallback) queue 142 in pull notification service 140, e.g., with an additional polling mechanism used to process those and send them out again for publishing. This may be considered a combination of the sixth environment and the seventh environment.

These embodiments thus allow for fewer points of failure by removing a hop in the flow, allow for minimal overhead to mutation flow for application synchronization service 108, allow use of pull notification service 140 (e.g., failure queue 142 thereof) for noisy customer (e.g., ones with multiple attempts to publish the same request), and/or allow for a retry in the publishing flow. However, certain of these embodiments may cause additional operational overhead, creates confusing flows that are difficult to test, restrict the publishing service 104 from being a standalone service, and/or complicate the separation of work division by the components.

As one example use, as shown at circle (1), the user 126 may utilize a client application 120 executed by a computing device 122 (e.g., a web-application implementing a console 124 for the provider network 100, a standalone application, another web-application of another entity that utilizes the application synchronization service 108 and/or publishing service 104 as a part of its backend, a database or mixed-SQL environment, etc.) to cause the computing device 122 to upload the subscription 110, e.g., the subscription of certain subscribers 102 to receive a notification of a modification (e.g., mutation) to a data source monitored by the application synchronization service 108. In one embodiment, the subscription 110 is uploaded via websocket service 144. Thereafter, at circle (2A) and circle (2B), respectively, a modification to data source 116 and/or data source 118 is detected in this example use, and application synchronization service 108 sends a request at circle (3) to push notification service 138. In this example use, push notification service 138 then sends a success code (e.g., "200" code) at circle (4) to application synchronization service 108. Application synchronization service 108 may then continue to service other subscriptions/modifications. Thereafter, at circle (5), push notification service 138 is to push the request (or a message based on the request) to pull notification service 140, and subscribers may then pull, at circle (7), that request (e.g., the notification of the mutation corresponding to the request) from pull notification service 140, e.g., via WebSocket service 144 at circle (6). However, for a failure to receive the request from circle (3) by the push notification service 138, the application synchronization service 108 at circle (8) is to send the request (or a message based on the request) to pull notification service 140 (e.g., failure queue 142 thereof). In this example, at circle (9), application synchronization service 108 polls the pull notification service 140 (e.g., failure queue 142 thereof) for any failed requests, and then causes a retry of the request to publish at circle (3).

Figure 9:
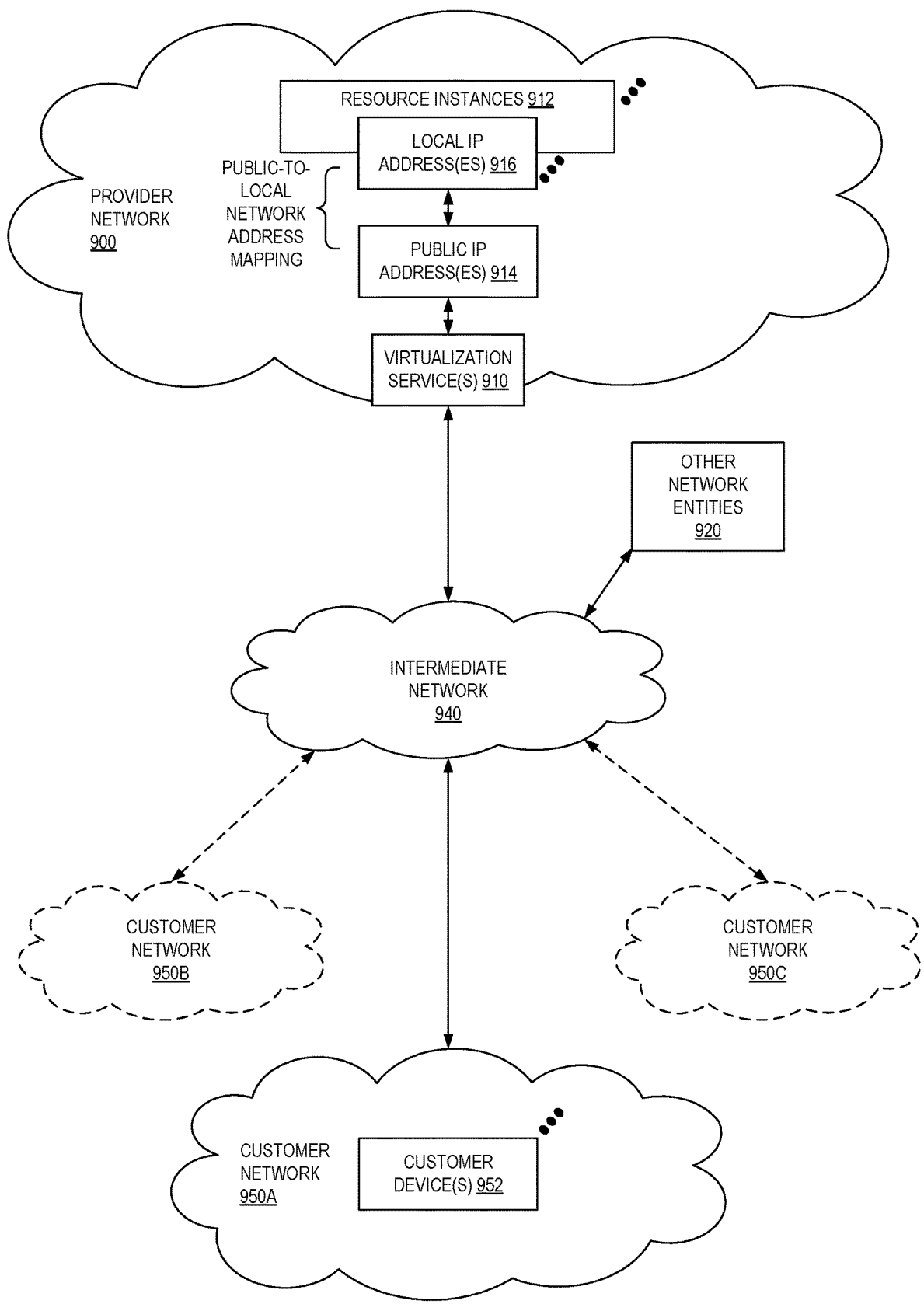
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
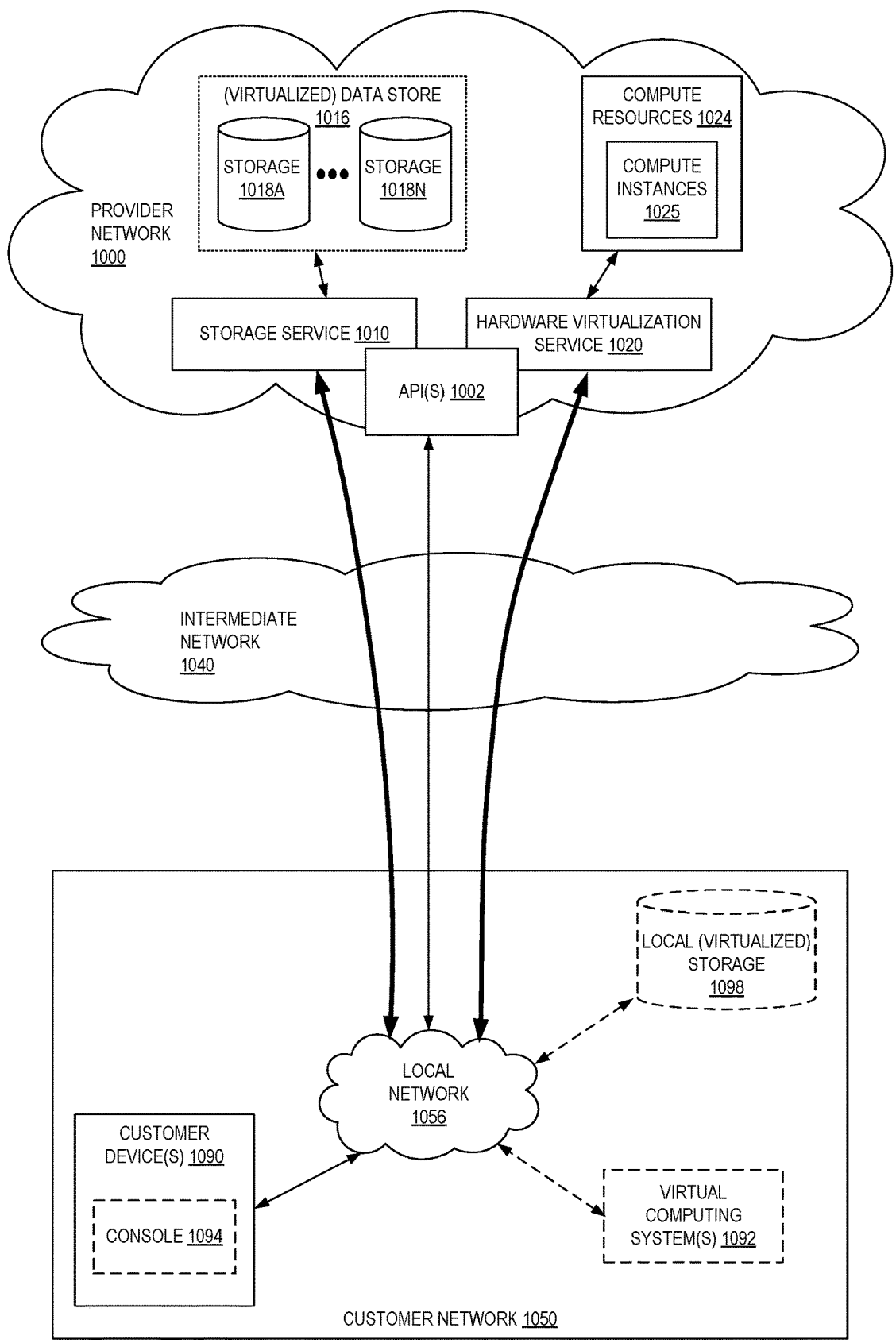
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple compute resources 1024 (e.g., compute instances 1025 such as VMs) to customers. The compute resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the compute resources 1024 to public Internet destinations, and from public Internet sources to the local IP addresses of compute resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
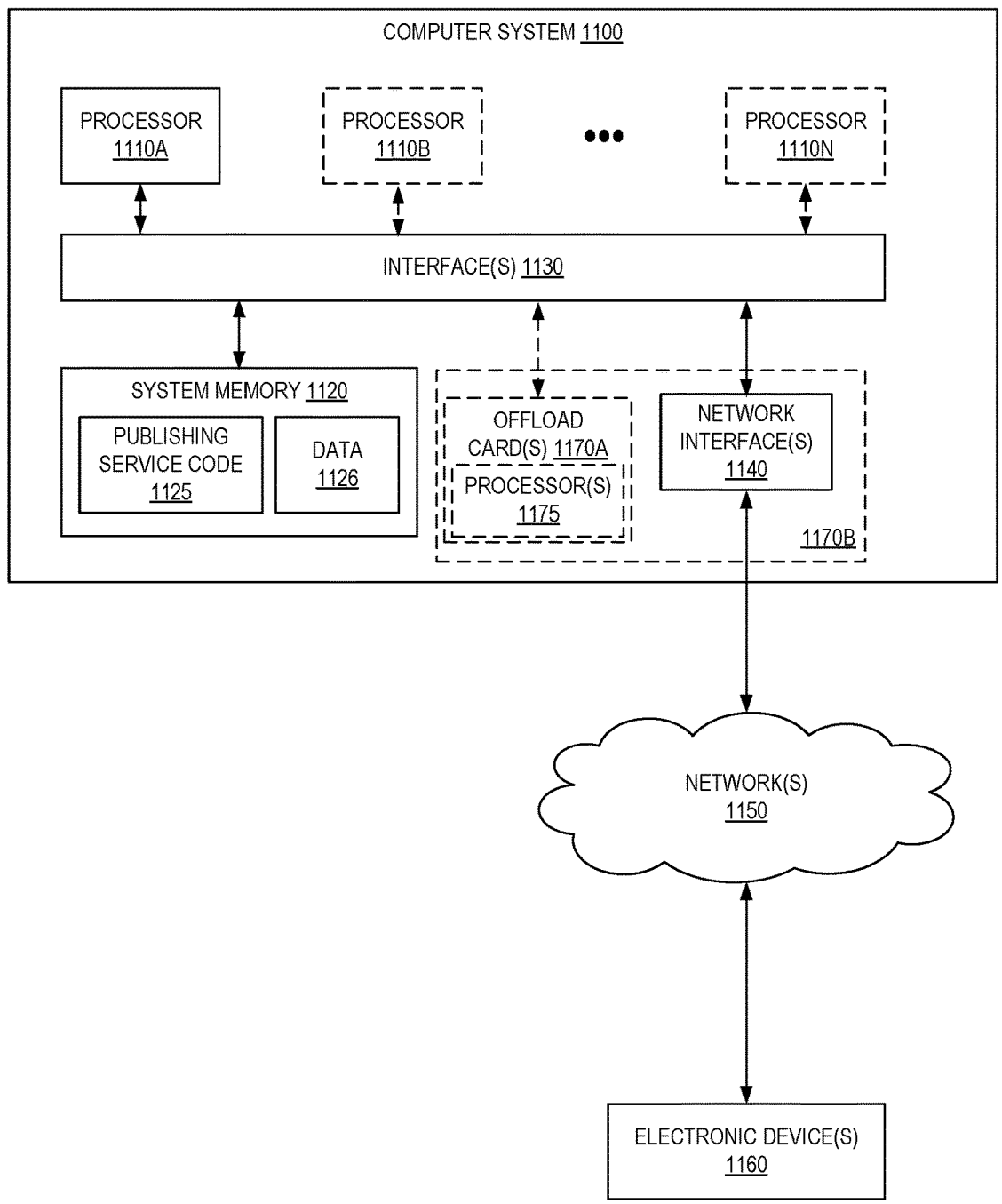
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as publishing service code 1125 (e.g., executable to implement, in whole or in part, the publishing service 104) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170A or 1170B (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some embodiments the offload card(s) 1170A or 1170B can perform compute instance management operations such as pausing and/or un-pausing compute instances, launching and/or terminating compute instances, performing memory transfer/copying operations, etc. These management operations may, in some embodiments, be performed by the offload card(s) 1170A or 1170B in coordination with a hypervisor (e.g., upon a request from a hypervisor) that is executed by the other processors 1110A-1110N of the computer system 1100. However, in some embodiments the virtualization manager implemented by the offload card(s) 1170A or 1170B can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
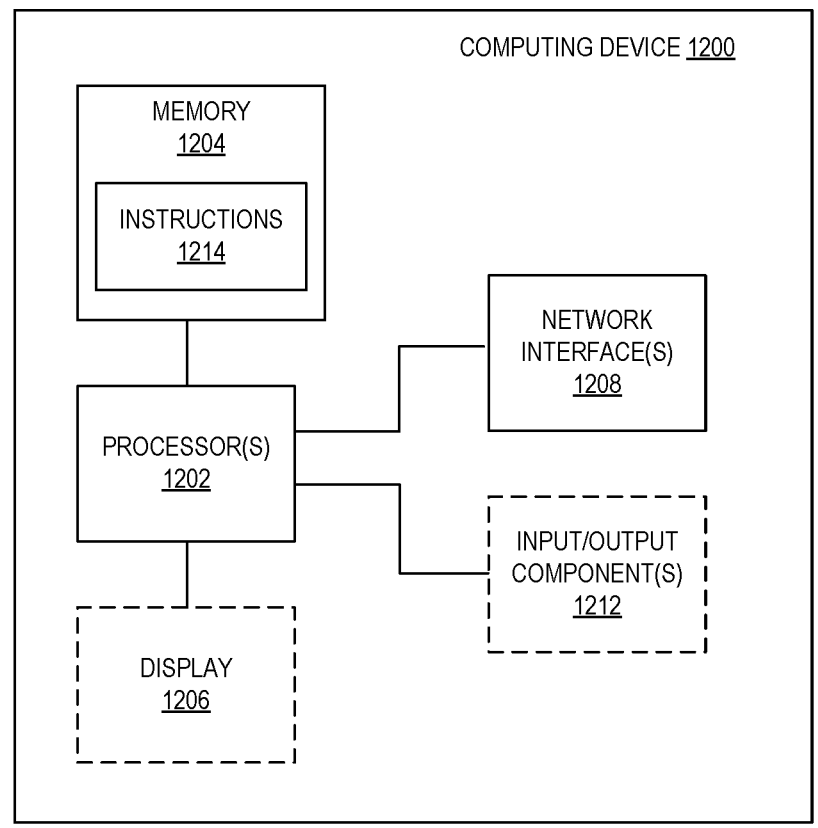
FIG. 12 illustrates a logical arrangement of a set of general components of an exemplary computing device that can be utilized in accordance with various embodiments.

FIG. 12 illustrates a logical arrangement of a set of general components of an example computing device 1200 such as computing device 122, etc. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (e.g., instructions 1214) and/or data, and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1214) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
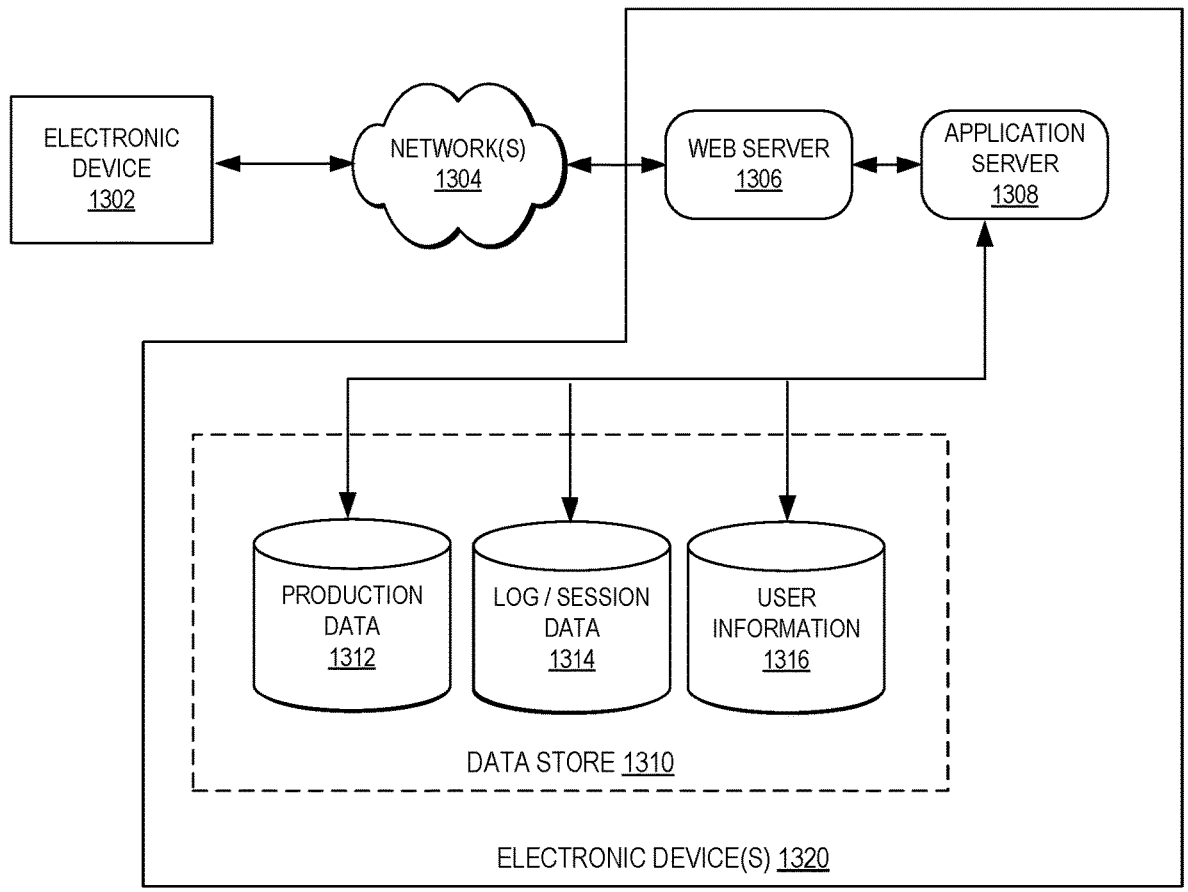
FIG. 13 illustrates an example of an environment for implementing aspects in accordance with various embodiments.

As discussed, different approaches can be implemented in various environments in accordance with the described embodiments. For example, FIG. 13 illustrates an example of an environment for implementing aspects in accordance with various embodiments. For example, in some embodiments publication requests and/or subscription requests are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at a computer-implemented publishing service, a request from a requestor to publish a notification to a set of one or more subscribers of the computer-implemented publishing service;
   storing the request to publish the notification in a memory queue of a first host of the computer-implemented publishing service;
   sending a success code to the requestor based at least in part on the storing of the request to publish the notification in the memory queue;
   removing the request to publish the notification from the memory queue based at least in part on the request to publish the notification being received by a push notification service;
   receiving the request to publish the notification by a pull notification service from the push notification service;
   sending the notification to the set of one or more subscribers from the pull notification service based at least in part on a pull request from the set of one or more subscribers;
   storing the request to publish the notification in a failure queue of a second host of the computer-implemented publishing service when the request to publish the notification by the push notification service fails; and
   storing the request to publish the notification in a memory queue of a third host of the computer-implemented publishing service from the failure queue.

2. The computer-implemented method of claim 1, further comprising:
   receiving, at the computer-implemented publishing service, a second request from a second requestor to publish a second notification to a second set of one or more subscribers of the computer-implemented publishing service;
   storing the second request to publish the second notification in a second memory queue of a third host of the computer-implemented publishing service;
   sending a second success code to the second requestor based at least in part on the storing of the second request to publish the second notification in the second memory queue;
   removing the second request to publish the second notification from the second memory queue based at least in part on the second request to publish the second notification being received by a second notification service; and
   publishing the second notification to the second set of one or more subscribers by the second notification service.

3. The computer-implemented method of claim 2, wherein the notification service utilizes a different thread pool than the second notification service.

4. The computer-implemented method of claim 2, further comprising updating, when the second request to publish the second notification is stored in the second memory queue, a queue size metrics value that indicates available slots in the first memory queue of the first host and the second memory queue of the third host.

5. The computer-implemented method of claim 1, wherein the storing the request to publish the notification in the memory queue of the computer-implemented publishing service is in a first memory queue of a first shard of the first host of the computer-implemented publishing service, and the method further comprises:
   receiving, at the computer-implemented publishing service, a second request from a second requestor to publish a second notification to a second set of one or more subscribers of the computer-implemented publishing service;
   storing the second request to publish the second notification in a second memory queue of a second shard of the first host of the computer-implemented publishing service;
   sending a second success code to the second requestor based at least in part on the storing of the second request to publish the second notification in the second memory queue;
   removing the second request to publish the second notification from the second memory queue based at least in part on the second request to publish the second notification being received by a second notification service; and
   publishing the second notification to the second set of one or more subscribers by the second notification service.

6. The computer-implemented method of claim 5, further comprising updating, when the second request to publish the second notification is stored in the second memory queue, a queue size metrics value that indicates available slots in the first memory queue of the first shard and the second memory queue of the second shard.

7. The computer-implemented method of claim 1, wherein the success code is a level one quality of service (QOS) success code according to a Message Queuing Telemetry Transport (MQTT) standard.

8. The computer-implemented method of claim 1, wherein the storing the request to publish the notification in the memory queue of the computer-implemented publishing service is in a first memory queue of a plurality of memory queues of the first host of the computer-implemented publishing service.

9. A system comprising:
   a first one or more electronic devices to implement a notification service in a provider network; and
   a second one or more electronic devices to implement a publishing service in the provider network, the publishing service including instructions that upon execution cause the publishing service to perform operations comprising:
      receiving a request from a requestor to publish a notification to a set of one or more subscribers of the publishing service,
      storing the request to publish the notification in a memory queue of a first host of the publishing service,
      sending a success code to the requestor based at least in part on the storing of the request to publish the notification in the memory queue,
      removing the request to publish the notification from the memory queue based at least in part on the request to publish the notification being received by a push notification service,
      receiving the request to publish the notification by a pull notification service from the push notification service, sending the notification to the set of one or more subscribers from the pull notification service based at least in part on a pull request from the set of one or more subscribers, storing the request to publish the notification in a failure queue of a second host of the publishing service when the request to publish the notification by the push notification service fails, and storing the request to publish the notification in a memory queue of a third host of the publishing service from the failure queue.

10. The system of claim 9, wherein the operations further comprise:

receiving, at the publishing service, a second request from a second requestor to publish a second notification to a second set of one or more subscribers of the publishing service;

storing the second request to publish the second notification in a second memory queue of a third host of the publishing service;

sending a second success code to the second requestor based at least in part on the storing of the second request to publish the second notification in the second memory queue;

removing the second request to publish the second notification from the second memory queue based at least in part on the second request to publish the second notification being received by a second notification service; and publishing the second notification to the second set of one or more subscribers by the second notification service.

11. The system of claim 10, wherein the notification service utilizes a different thread pool than the second notification service.

12. The system of claim 10, wherein the operations further comprise updating, when the second request to publish the second notification is stored in the second memory queue, a queue size metrics value that indicates available slots in the first memory queue of the first host and the second memory queue of the third host.

13. The system of claim 9, wherein the storing the request to publish the notification in the memory queue of the publishing service is in a first memory queue of a first shard of the first host of the publishing service, and the operations further comprise:

receiving, at the publishing service, a second request from a second requestor to publish a second notification to a second set of one or more subscribers of the publishing service;

storing the second request to publish the second notification in a second memory queue of a second shard of the first host of the publishing service;

sending a second success code to the second requestor based at least in part on the storing of the second request to publish the second notification in the second memory queue;

removing the second request to publish the second notification from the second memory queue based at least in part on the second request to publish the second notification being received by a second notification service; and publishing the second notification to the second set of one or more subscribers by the second notification service.

14. The system of claim 13, further comprising updating, when the second request to publish the second notification is stored in the second memory queue, a queue size metrics value that indicates available slots in the first memory queue of the first shard and the second memory queue of the second shard.

15. The system of claim 9, wherein the success code is a level one quality of service (QOS) success code according to a Message Queuing Telemetry Transport (MQTT) standard.

16. The system of claim 9, wherein the storing the request to publish the notification in the memory queue of the publishing service is in a first memory queue of a plurality of memory queues of the first host of the publishing service.

17. A computer-implemented method comprising:

receiving, at a publishing service of a provider network, a request from an application synchronization service of the provider network to publish a notification of a mutation of a data source to a set of one or more subscribers separate from the provider network;

storing the request to publish the notification in a memory queue of a first host of the provider network;

sending a success code to the application synchronization service based at least in part on the storing of the request to publish the notification in the memory queue;

removing the request to publish the notification from the memory queue based at least in part on the request to publish the notification being received by a push notification service of the provider network;

pushing the request to publish the notification to a pull notification service of the provider network from the push notification service of the provider network;

sending the notification to the set of one or more subscribers from the pull notification service of the provider network based at least in part on a pull request from the set of one or more subscribers when the pushing succeeds;

storing the request to publish the notification in a failure queue of a second host of the provider network when the pushing fails;

polling the failure queue of the second host by a third host; and storing the request to publish the notification in a memory queue of the third host from the failure queue of the second host.

18. The computer-implemented method of claim 17, further comprising:

polling the failure queue of the second host by the first host; and storing the request to publish the notification in the memory queue of the first host from the failure queue of the second host.

19. The computer-implemented method of claim 18, further comprising deleting the request to publish the notification from the failure queue of the second host in response to storing the request to publish the notification in the memory queue of the first host from the failure queue of the second host.

20. The computer-implemented method of claim 17, further comprising deleting the request to publish the notification from the failure queue of the second host in response to storing the request to publish the notification in the memory queue of the third host from the failure queue of the second host.

21. The computer-implemented method of claim 17, further comprising:

receiving, at the publishing service of the provider network, a second request from the application synchronization service of the provider network to publish a second notification of a second mutation of a second data source to a second set of one or more subscribers separate from the provider network;

storing the second request to publish the second notification in a second memory queue of a third host of the publishing service;

sending a second success code by the third host to the application synchronization service based at least in part on the storing of the second request to publish the second notification in the second memory queue;

removing the second request to publish the second notification from the second memory queue by the third host based at least in part on the second request to publish the second notification being received by a second push notification service of the provider network; and publishing the second notification of the second mutation to the second set of one or more subscribers by the second push notification service.

* * * * *